United States Patent [19]

Lanni et al.

[11] 4,005,608

[45] Feb. 1, 1977

[54] ELECTRICALLY CONTROLLED RATE INTEGRATING DEVICE

[75] Inventors: Michael J. Lanni, Ridgewood, N.J.;
John Calamera, Staten Island, N.Y.;
Leon Krebs, Fair Lawn, N.J.;
Bernard J. O'Connor, Eastchester, N.Y.

[73] Assignee: The Bendix Corporation, Teterboro, N.J.

[22] Filed: Apr. 15, 1975

[21] Appl. No.: 560,900

[52] U.S. Cl. .................................. 73/504; 74/5.4
[51] Int. Cl.² .................... G01P 9/02; G01C 19/42
[58] Field of Search ............... 73/504, 503, 517 B, 73/516 R; 74/5.4; 318/676

[56] References Cited

UNITED STATES PATENTS

| | | | |
|---|---|---|---|
| 2,853,287 | 9/1958 | Draper et al. | 73/516 R |
| 3,398,341 | 8/1968 | Dooley et al. | 74/5.4 |

*Primary Examiner*—James J. Gill
*Attorney, Agent, or Firm*—Anthony F. Cuoco; S. H. Hartz

[57] ABSTRACT

A rate integrating device includes a torquer in open loop configuration for torquing the device to null and a load connected to the device in closed loop configuration for maintaining the device at null. The load loop includes electrical means whereby the maintenance of the device at null is controlled independent of its dynamic characteristics for increased accuracy and stability.

5 Claims, 2 Drawing Figures

ELECTRICALLY CONTROLLED RATE INTEGRATING DEVICE

BACKGROUND OF THE INVENTION

1. Field of the Invention

This invention relates generally to rate integrating devices and, more particularly, to rate integrating devices having increased accuracy and stability. Still more particularly, this invention relates to a rate integrating device of the type described and including auxiliary electrical means for maintaining the device at null independent of the dynamic characteristics of the device such as gimbal moment of inertia and system damping factor.

2. Description of the Prior Art

Conventional rate integrating gyro systems, for example, include a torquer in open loop configuration, and responsive to command and bias signals for driving the gyro gimbal to null, and a load in closed loop configuration for maintaining the gimbal at null. In rate integrating gyros of this type the characteristic time of the instrument is primarily influenced by the moment of inertia of the gyro gimbal and the damping factor of the system. Further, an output axis error is developed when command and bias torques are applied to the instrument. The device of the present invention eliminates these disadvantages.

SUMMARY OF THE INVENTION

This invention contemplates a rate integrating device including a sensing element for providing a signal in response to a condition sensed by the device. A first torquer is responsive to command and bias input signals for torquing a gimbal to null. A second torquer is driven by the sensing element for providing a current which is applied to circuitry including an integrator, and the integrated current is applied to means for driving a load. The load is displaced, and which displacement is applied to the device to maintain the gimbal at null.

The main object of this invention is to provide a rate integrating device which operates independent of its dynamic characteristics for increased accuracy and stablility.

Another object of this invention is to provide a rate intergrating device including auxiliary electrical means for affecting control of the device independent of its dynamic characteristics.

Another object of this invention is to provide a rate integrating device of the type described and including a first output axis torquer for driving the device to null in response to command and bias signals and a second output axis torquer for providing a current in response to a sensed condition, and which current is integrated for driving a load, whereby the load is displaced and the displacement is applied for maintaining the device at null.

Another object of this invention is to provide a rate integrating device of the type described whereby command and bias signals are applied without introducing output axis error as has heretofore been the case.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
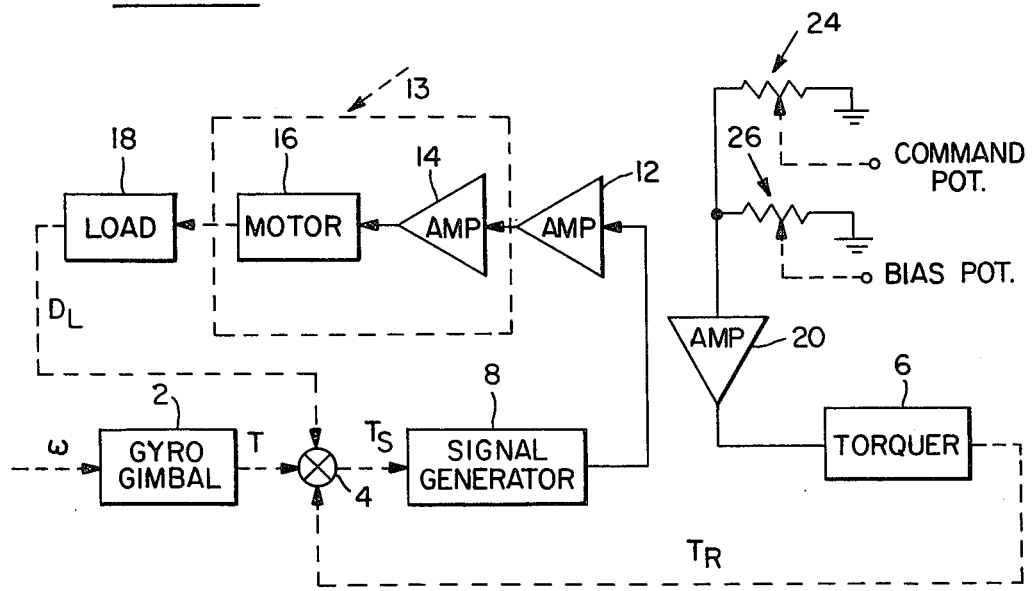
FIG. 1 is a block diagram showing a conventional prior art rate integrating device.

FIG. 1 shows, for purposes of illustration, a prior art rate integrating gyro. A gimbal 2, which may be a conventional gyro gimbal, receives an inertial input $\omega$ and provides a torque T corresponding to the angular rotation rate of the gyro rotor or mass and the moment of inertia thereof as is well understood in the art.

Torque T is applied to a summing means 4 as is a torque $T_R$ provided by an open-loop torquer 6. Torquer 6 provides torque $T_R$ in response to signals provided by an operator-operated command potentiometer 24 and an operator-operated bias potentiometer 26, and which signals are applied through an amplifier 20 to torquer 6.

A load 18 which may be another gimbal in slaved arrangement with gimbal 2, or any other type load as the case may be, is displaced in a manner to be hereinafter described to provide a displacement $D_L$. Displacement $D_L$ is applied to summing means 4 and summed thereby with torque T provided by gyro gimbal 2 and torque $T_R$ provided by torquer 6 to provide a summation torque $T_S$. Summing means 4 is shown for illustration purposes as external to gimbal 2 but is actually a point on the gimbal as will be understood by those skilled in the art. The summation of torques and displacements in a rate gyro configuration is well practiced in the art and is illustrated in the text Inertial Guidance, by Pitman, published in 1962 by John Wiley and Sons, New York and particularly at Chapter 3, FIG. 3—3, page 79 thereof.

Torque $T_S$ displaces a signal generator 8, and which signal generator may be a conventional type gyro pick-off mounted on gimbal 2. Signal generator 8 provides a signal corresponding to the displacement, and which signal is applied through a buffer amplifier 12 and therefrom through a load driving means 13. Means 13 may be a conventional type servo system, having an amplifier 14 and motor 16, for driving load 18 to provide the aforenoted displacement $D_L$.

Figure 2:
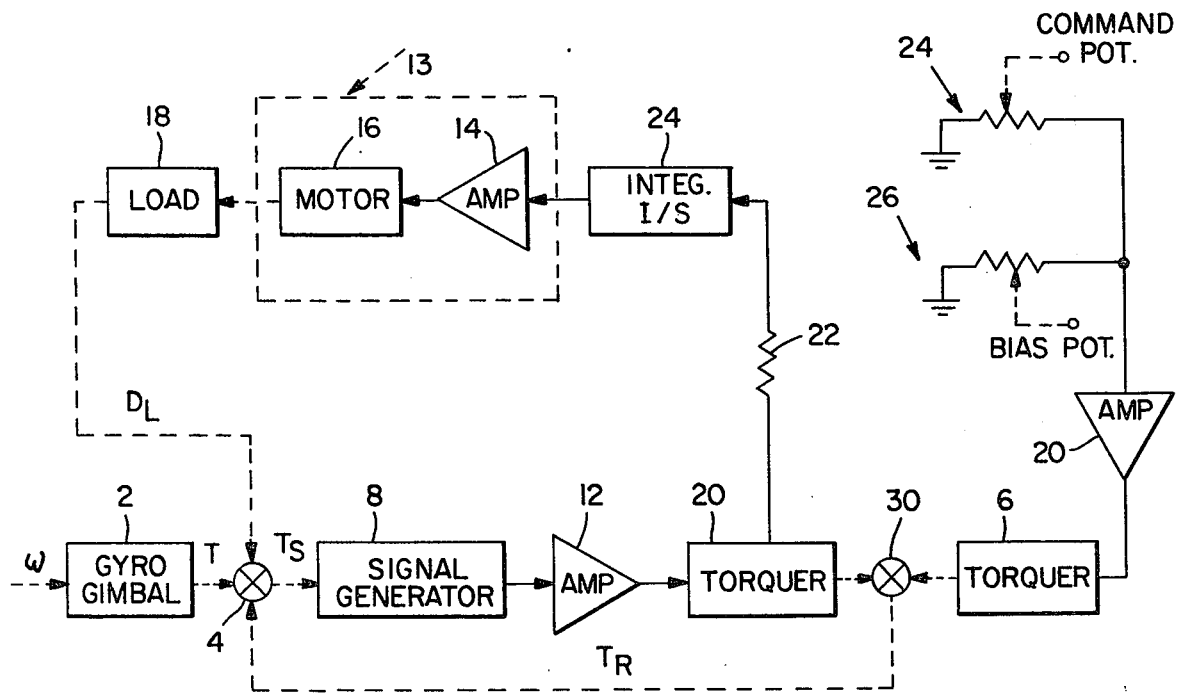
FIG. 2 is a block diagram of a rate integrating device according to the invention.

With the prior art configuration of figure 1, it is noted that torquer 6 is connected in open loop configuration and load 18 is connected in closed loop configuration. In a device of this type, the characteristic time, i.e. rate integrating response, is primarily influenced by the dynamics involved including the moment of inertia of the gyro gimbal and the damping factor of the system. In order to overcome this and other disadvantages of the prior art systems, the device of the invention as shown in FIG. 2 has been developed and will be next described with reference to the figure, wherein components corresponding to those of FIG. 1 carry corresponding numerical designations.

Thus, torque T from gyro gimbal 2 is applied to summing means 4. The output from signal generator 8 provided in response to Torque $T_S$ is applied through an amplifier 12 to a torquer 20 included in the load loop. The current from torquer 20 is applied through a load resistor 22 to an integrator 24. The integrated torquer current is applied to amplifier 14 in load driving means 13 and therefrom to motor 16 for driving load 18 whereby the aforenoted displacement $D_L$ is provided. In this connection it is noted that integrator 24 may be of the conventional type including an operational amplifier and a capacitor connected in feedback relation thereto such as described at pages 356–357, *Electronics For Scientists*, Malstadt, et al, W. A. Benjamin, Inc. N.Y. 1963.

OPERATION OF THE INVENTION

A basic feature of the invention is the dual torquer arrangement including torquer 6 and torquer 20. As heretofore noted, torquer 6 is effective for nulling gyro gimbal 2 in response to command and bias signals provided by potentiometers 24 and 26. Torquer 20 provides current which is applied through circuitry including resistor 22 and integrator 24 for driving load 18, and which load 18 is thereupon displaced with the displacement being summed with torque T from gyro gimbal 2 and torque $T_R$, which is now the summation of the torque from torquer 20 and torquer 6 provided by a summing means 30, to provide torque $T_S$.

The advantages of the arrangement such as described with reference to FIG. 2 are that there is no output axis deflection due to the command and bias signals since the loop including resistor 22, integrator 24, driving means 13 and load 18 maintains gimbal 2 at null independent of the dynamics of the system, thereby increasing accuracy and stability. In other words, the rate sensing portion of the device is continuously operated in a "capture" mode, and as such provides rate of turn information. The response of the device is primarily controlled by integrator 24 which generates the time integral of the rate of turn information, and which is utilized by load driving means 18. The bandwidth of the gyro can thus be set so that the gyro can respond, for example, to signals above 100 Hz., with a predominant response time of 0.001 seconds as is desirable for many applications.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A sensor system, comprising:
a sensor for providing a first torque in response to a sensed condition;
means for providing a second torque;
a displaceable load;
means for combining the first and second torques and the load displacement;
a signal generator connected to the combining means and responsive to the combined first and second torques and load displacement for providing a corresponding signal;
means connected to the signal generator and responsive to the signal therefrom for providing another signal;
means connected to the last mentioned means and connected to the load, and responsive to the signal from the last mentioned means for displacing the load; and
the means for providing a second torque including means for providing a third torque in response to command and bias signals, means connected to the signal generator and responsive to the signal therefrom for providing a fourth torque, and means for combining the third and fouth torques to provide the second torque.

2. A sensor system as described in claim 1, wherein:
the means connected to the signal generator and responsive to the signal therefrom for providing another signal includes the means for providing the fourth torque.

3. A sensor system as described by claim 1, wherein the means connected to the last mentioned means and connected to the load, and responsive to the signal from the last mentioned means for displacing the load includes:
means for integrating the signal from the last mentioned means; and
displacing means connected to the integrating means and to the load, and responsive to the integrated signal for displacing the load.

4. A sensor system as described by claim 1, wherein:
the means for combining the first and second torques and the load displacement includes means for summing said torques and displacement.

5. A sensor system as described by claim 1, wherein:
the means for combining the third and fourth torques to provide the second torque includes means for summing said third and fourth torques.

* * * * *